US008320380B2

(12) United States Patent
Lange

(10) Patent No.: US 8,320,380 B2
(45) Date of Patent: *Nov. 27, 2012

(54) UNDER-ASSIGNING RESOURCES TO VIDEO IN TRIPLE-PLAY VIRTUAL TOPOLOGIES TO PROTECT DATA-CLASS TRAFFIC

(75) Inventor: Andrew S. Lange, Culver City, CA (US)

(73) Assignee: Alcatel Lucent, Paris (FR)

( * ) Notice: Subject to any disclaimer, the term of this patent is extended or adjusted under 35 U.S.C. 154(b) by 1016 days.

This patent is subject to a terminal disclaimer.

(21) Appl. No.: 11/717,876

(22) Filed: Mar. 13, 2007

(65) Prior Publication Data

US 2008/0225706 A1    Sep. 18, 2008

(51) Int. Cl.
*H04L 12/56* (2006.01)
(52) U.S. Cl. ........... 370/395.21; 370/395.31; 370/395.5; 370/420; 370/428; 370/469; 370/487; 709/221; 709/222; 709/232
(58) Field of Classification Search ............. 370/395.21, 370/395.31, 395.5, 420, 428, 469, 486, 487; 709/221–222, 232–235
See application file for complete search history.

(56) References Cited

U.S. PATENT DOCUMENTS

| 2003/0074443 | A1* | 4/2003 | Melaku et al. ................. 709/224 |
| 2005/0276218 | A1* | 12/2005 | Ooghe et al. .................. 370/229 |
| 2006/0039364 | A1* | 2/2006 | Wright ........................... 370/352 |
| 2006/0168208 | A1* | 7/2006 | Nagami ......................... 709/224 |
| 2006/0215548 | A1* | 9/2006 | Le Faucheur et al. ........ 370/228 |

OTHER PUBLICATIONS

Pathan et al., Economy-based Content Replication for Peering Content Delivery Networks, Technical report, GRIDS-TR-2006-21, Grid Computing and Distributed Systems and Laboratory, University of Melbourne, Australia, Dec. 4, 2006.*
Panduro et al., The Return Channel in Collective Installations, 1999, Multimedia Applications, Services and Techniques—ECMAST'99, Lecture Notes in Computer Science, 1999, vol. 1629/1999, 143-153, DOI: 10.1007/3-540-48757-3_11.*
Durham et al., RFC-2748: The COPS (Common Open Policy Service) Protocol, Jan. 2000, IETF.*

* cited by examiner

*Primary Examiner* — Hoon J Chung
(74) *Attorney, Agent, or Firm* — Wolff & Samson PC

(57) ABSTRACT

A method for video-on-demand (VoD) admission control at a network edge assigns to a triple-play network virtual topology lesser resources than there exists in a corresponding underlying physical link bandwidth. This prevents video-on-demand (VoD) starvation of data-class traffic. At least one policy enforcement point (PEP) is attached to an edge of the network, providing for autonomous short-term, application-aware controls to be applied to corresponding network ingress traffic, and also providing for long-term controls on corresponding network ingress traffic. The network ingress traffic to the network comes under management when the traffic nears or exceeds network capacity. It is enabled to do so by computations of current network routing topology and bandwidth reservations. Path tables are used to calculate if a PEP may admit more, or must shed, sessions/calls to maintain service for other existing application traffic. The PEP and a session/call admission controller (S/CAC) may be independently located within the topology of the network, and together implement admission controls that differentiate between triple-play video, voice, and data traffic classes.

12 Claims, 8 Drawing Sheets

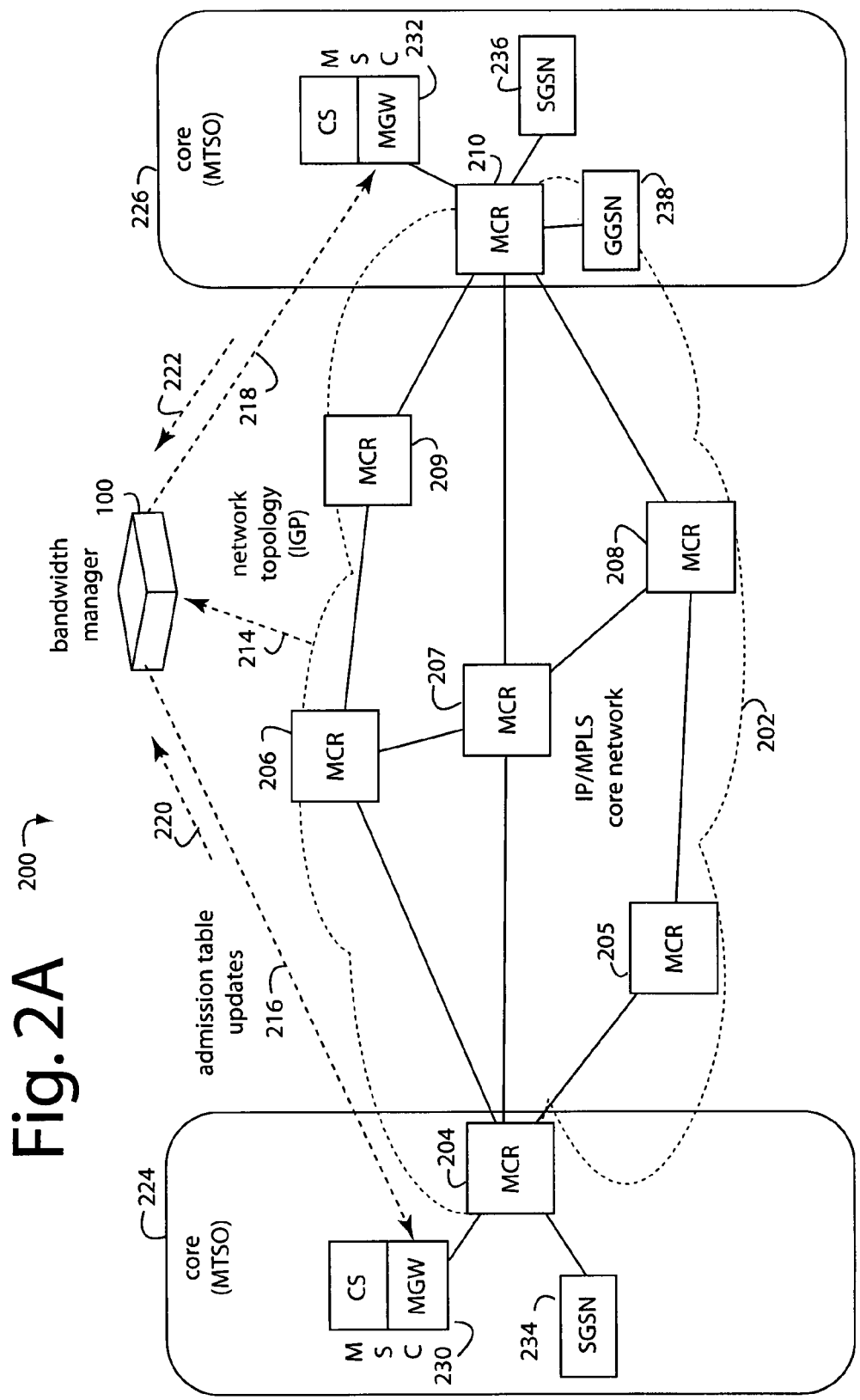

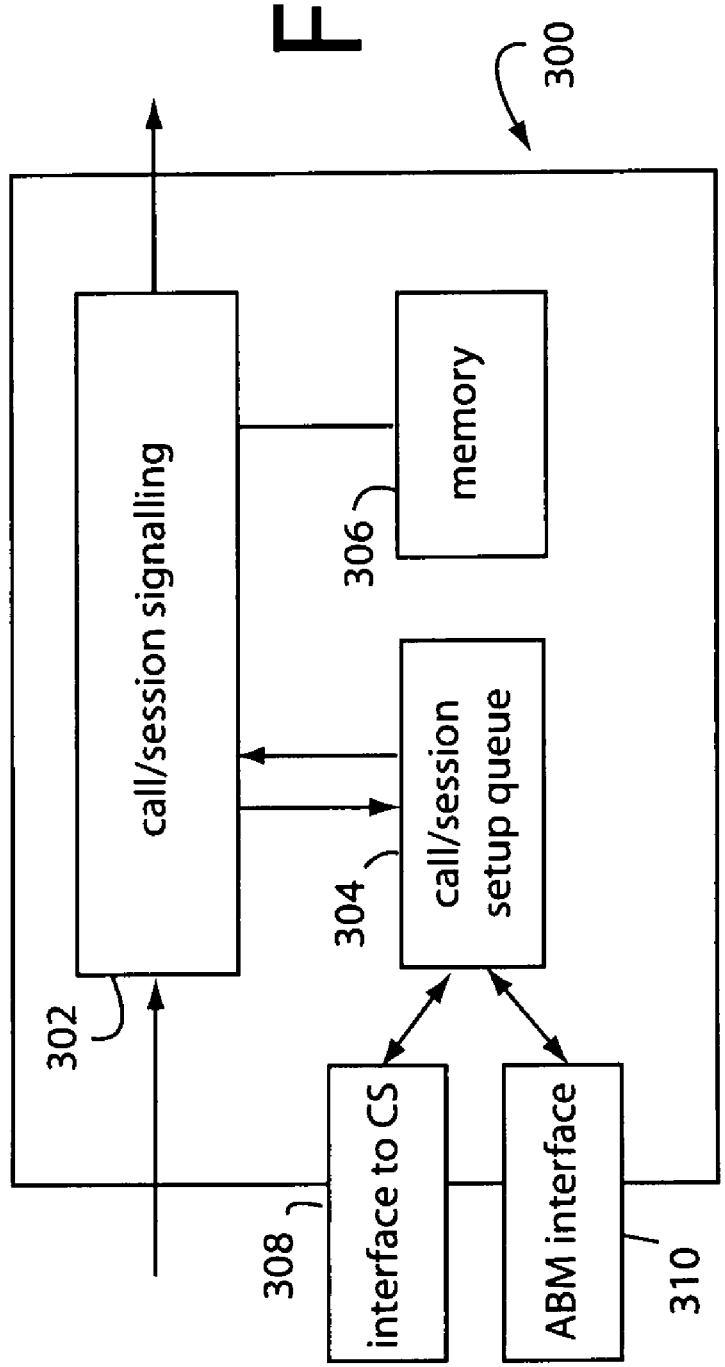

UNDER-ASSIGNING RESOURCES TO VIDEO IN TRIPLE-PLAY VIRTUAL TOPOLOGIES TO PROTECT DATA-CLASS TRAFFIC

BACKGROUND OF THE INVENTION

1. Field of the Invention

The present invention relates to end-to-end quality of service (QoS) in triple play computer networks, and in particular to methods to prevent starvation of low priority data class traffic by video-on-demand traffic by assigning lesser resources to a virtual topology than actually exist in the underlying physical links.

2. Description of the Prior Art

The challenging applications that telecommunications networks must support now include fixed and mobile voice, broadcast and on-demand video, and data. Each type of application places different demands on the network's resources. Some applications are more sensitive to loss, delay, or jitter, than are the others. But always, the principal quality of service objective is to satisfy the end-user's expectations.

An ideal goal in designing and engineering packet-switched networks is to be able to continue to satisfy the traffic demands of voice, video and data applications in spite of worst-case, single failures under peak load conditions. A network so robust as this has a very high probability of being able to continue to provide all the various applications with all the resources they need to deliver a flawless user experience.

However, such ideal design cannot always be accommodated due to the costs involved and shortages of resources. Growth in demand can develop more quickly than the provisioning can keep up with. Mistakes can be made. Multiple critical network failures can happen at the same time, and cause the network to congest such that information is lost in transmission and the end-user experience is degraded.

Some applications, such as email, can naturally deal with congestion. Congestion with email traffic rarely causes a change in user experience, and its effects are often acceptable. However, voice, video, and other applications are more real-time, and much more sensitive to network delays and congestion. The end-user experience can degrade quickly and affect all users simultaneously.

Packet-switched networks can be designed to prioritize traffic when congestion is threatened. Each application marks its data with a particular traffic class, and each marking is read later to place the traffic in a priority order. When the network starts to congest, the routers forwarding onto congested links can change modes to begin sending only the traffic marked with the highest class first. Then the second highest class traffic is forwarded, and so on, up until the link congests, and the router starts to drop traffic.

In most cases of congestion, such a priority traffic mechanism is enough to ensure that high priority applications get the resources they need. But too much traffic within a class can congest a network anyway.

If losses occur in a data traffic-class, data applications can usually cope with it and gracefully recover. There will be little or no degradation in user experience. But if the losses occur in a voice or video traffic class, voice and video applications are usually not equipped to cope with it. So their service will be degraded across all the users when an application-dependent threshold of degradation is reached. After which, the application effectively becomes unusable. So something more than simple traffic-class prioritization is needed.

Session/Call Admission Control (S/CAC) is a good answer. S/CAC limits the sessions/calls that are admitted into the network to only those that the network can support at a particular quality level. S/CAC will deny some later users any service, in order to prevent everyone else's existing service from degrading. S/CAC guards against multiple failures, or a lack of available resources, to service anticipated peak load under single failure. It prevents losses due to resource congestion from growing from small to large. But S/CAC is not easy to implement in an packet-switched network because the routing topology is ever-changing and a way to enforce bandwidth reservations is needed.

Voice and data have traditionally been supported by two independent networks. Voice transport over IP (VoIP) allows service providers to merge voice and data networks into a single infrastructure. The success of VoIP depends on being able to offer to the end user similar quality of experience. Speech communication quality is subjective, it depends on the users' expectations, the subjective perception of the call, overall quality, volume, intelligibility, speaker identification and naturalness, and physical factors such as loss, echo, delay and noise.

Video on demand (VoD) is almost as demanding as voice in many ways. The bandwidth required can be much greater, especially for high definition (HD) video.

VoIP and Video QoS is affected by delay and jitter (variation in delay). The packet network, terminals, and gateways can all delay the communication. If these delays are inconsistent they can add to jitter. The cumulative effects of these delays limits the achievable quality, delays longer than 400-ms break conversation interactivity.

Network delay in packet networks is due to transmission delay introduced in every link along the path to the destination and queuing delay in every router. Transmission delay depends on sub network technology, while queuing delay depends on queuing policies at the routers. Terminal delay depend on terminal type and processing power. Software-based terminals show higher delay than hardware-based ones. Special equipment such as low rate codec's is necessary to reduce network load, but this will also degrade speech quality by increasing quantizing noise, distortion and delay. The noise sources come from the power sum of electric circuit noise, and room noise. Noise sources at each end of the communication can be easily controlled by proper tuning of the loudness ratings and listener sidetone. The network affects network delay, jitter, and packet loss. But since delay and packet loss in the network are correlated, it can be said that a network with a limited delay will also have negligible packet loss.

IP networks offer an unreliable, connectionless network-layer service that is subject to packet loss, reordering and duplication, all of which, together with queuing delay in router buffers, will increase with network load.

Because of the lack of any firm delivery guarantees, traditional IP delivery is "best-effort". TCP and other higher layer end-to-end protocols are required to add-in end-to-end reliability. Network service degrades as the traffic in the network increases, causing problems for telephony and other real-time applications.

QoS protocols are used where traffic with real-time requirements is distinguished from other traffic classes that can tolerate delay, jitter and loss. Two strategies for QoS provisioning are resource reservation and prioritization. Resource reservation apportions network resources according to an application's QoS request, subject to a bandwidth management policy. In prioritization, network traffic is classified and apportioned amongst network resources according to bandwidth management policy criteria. Network routers give preferential treatment to classifications identified as having more demanding requirements, e.g., individual application flows or flow aggregates.

Flows are individual, uni-directional data streams between applications, e.g., as uniquely identified by transport protocol, source address and port number, and destination address and port number. Two or more flows with something in common are aggregates. Applications, network topology and policy dictate which type of QoS is most appropriate in a given situation.

Multiprotocol label switching (MPLS) provides for bandwidth management for aggregates via network routing control according to labels in (encapsulating) packet headers. MPLS builds paths across an IP network core, and sends packets along predefined paths. When a packet enters the network, an edge router looks up the destination address of the packet and tags it with a label that specifies the route and class of service (CoS) attributes.

One reason MPLS was developed was to allow routers to have smaller forwarding tables and, in theory, operate at higher speeds because they would act like simple switches. As labeled packets move across the network, each router uses the labels to choose the destination, and CoS, of the packet. Rather than looking up the destination address for each packet in a routing table, as the packet leaves the core of the network, an edge router uses the destination address in the packet to direct it to its final destination. Subsequent packets in the data stream are quickly and automatically labeled.

Label switching routers (LSR's) build the path that a packet takes across the core of the network, e.g., a label switched path (LSP). Labels stored by each router define the path, which can follow specific routes or constraints. LSRs at the core of the network participate in routing topology exchanges and become true peers with the edge routers. The number of peers each edge router must communicate with is reduced to the immediately adjacent LSRs and routers if certain protocols, such as LDP are used.

Labels can be used to identify traffic that should receive special treatment to meet QoS requirements. By using sophisticated traffic management techniques for the LSP's defined by the LSR's, guaranteed service level agreements can be delivered in an IP network environment. A more complex aspect of MPLS involves the distribution and management of labels among MPLS routers, to ensure they agree on the meaning of various labels. Label Distribution Protocol (LDP) is specifically designed for this purpose, but it is not the only possibility.

Admission controls are not needed in large networks with excess bandwidth. But real-world networks are run much closer to their limits because of construction costs and/or usage growth. What is needed are methods and equipment to provide end-to-end quality of service (QoS) in real networks.

SUMMARY OF THE INVENTION

Briefly, a method embodiment of the present invention for video-on-demand (VoD) admission control at a network edge assigns to a triple-play network virtual topology lesser resources than there exists in a corresponding underlying physical link bandwidth. This prevents video-on-demand (VoD) starvation of data-class traffic. At least one policy enforcement point (PEP) is attached to an edge of the network, providing for autonomous short-term, application-aware controls to be applied to corresponding network ingress traffic, and also providing for long-term controls on corresponding network ingress traffic. The network ingress traffic to the network comes under management when the traffic nears or exceeds network capacity. It is enabled to do so by computations of current network routing topology and bandwidth reservations. Path tables are used to calculate if a PEP may admit more, or must shed, sessions/calls to maintain service for other existing application traffic. The PEP and a session/call admission controller (S/CAC) may be independently located within the topology of the network, and together implement admission controls that differentiate between triple-play video, voice, and data traffic classes.

An advantage of the present invention is that a network is provided that can deliver acceptable quality for each service at an economical cost to end users.

Another advantage of the present invention is a networking method is provided for good planning and provisioning, so there will be enough fundamental bandwidth available to serve the demand, and provide effective integrated tools.

A further advantage of the present invention is that a network is provided for marking and giving priority treatment to important applications' traffic, so congestion is handled correctly, and priority traffic is sent first.

A still further advantage of the present invention is that a network is provided with bandwidth management of important applications.

A further advantage of the present invention is a network is provided for session or call admission control in the bandwidth management of important applications, so when there is congestion within a traffic class some users are denied service to preserve the quality of experience for the majority of users.

Another advantage of the present invention is a networking method and system are provided that are scalable, stable, flexible, and application-aware such that they take into account network life-cycles to assure the QoS.

These and other objects and advantages of the present invention will no doubt become obvious to those of ordinary skill in the art after having read the following detailed description of the preferred embodiments which are illustrated in the various drawing figures.

IN THE DRAWINGS

FIG. 2A is a functional block diagram of an packet-switched network embodiment of the present invention for voice in the mobile core;

FIG. 3 is a functional block diagram of a policy enforcement point embodiment of the present invention, as related to FIGS. 1 and 2;

DETAILED DESCRIPTION OF THE PREFERRED EMBODIMENT

Figure 1:
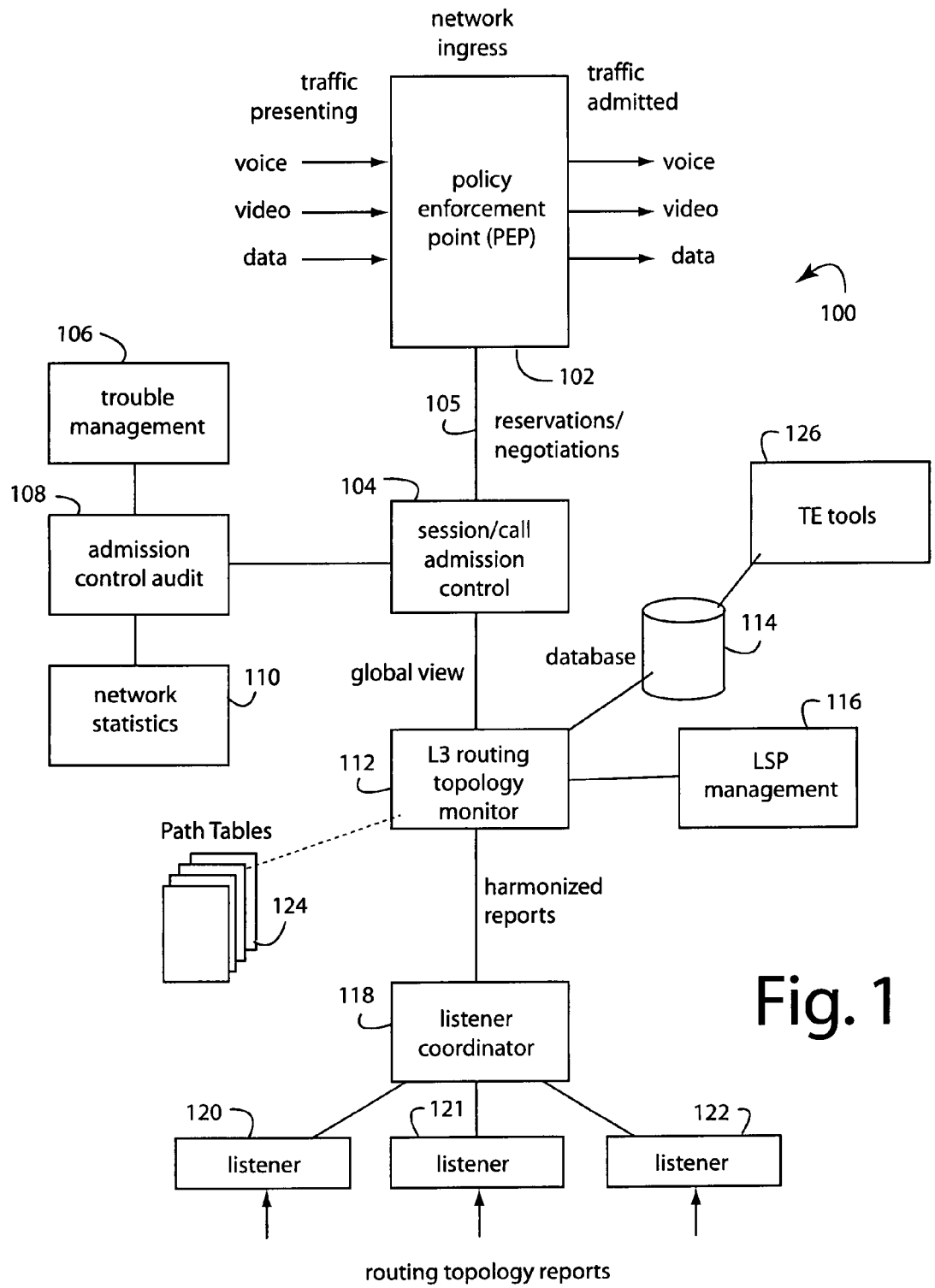
FIG. 1 is a functional block diagram of an advanced bandwidth management assembly embodiment of the present invention that can be attached to a packet-switched network to provide traffic class admission for end-to-end QoS.

FIG. 1 represents an advanced bandwidth manager (ABM) embodiment of the present invention, and is referred to herein by the general reference numeral 100. The bandwidth manager 100 comprises at least one policy enforcement point (PEP) 102, a session/call admission controller (S/CAC) 104, reservations/negotiation traffic 105, a trouble manager 106, an admission control audit function 108, a network statistic function 110, a layer-3 (L3) routing topology monitor 112, a database 114, a label switched path (LSP) manager 116, and a listener coordinator 118 connected to receive point-to-point core-router link reports, e.g., from a plurality of listeners 120-122. The routing topology monitor 112 builds a topology map from comprehensive point-to-point link information from the core-router link reports. It converts the information into abstracted end-to-end path connections listed in a path table 124 for an easy-to-index, single view of the network topology.

Engineering tools can be used to extract greater utilization from existing transport infrastructures. Therefore, an IP-transport network traffic engineering tool 126 is included that mines data collected and deposited in the ABM database 114. It provides empirical information that can be used as a basis to make intelligent network changes and improvements.

In a simple exemplary MPLS network routing topology for a network in the United States, each major city can be represented by a label switching router that can serve as a source, destination, or transit point label switching router for voice, video, and data application traffic. Table I is an end-to-end abstraction tabulation of various paths across the network that can begin in San Francisco (SFO). Reservations according to traffic class can further be allocated, apportioned, and prioritized according to service level agreements. Such example corresponds to a small part of path tables 124 in FIG. 1, and would be used with an admission table locally in the (SFO) PEP 102.

TABLE I

Example Partial Path Table in ABM
for traffic originating at PEP at SFO
Path

SFO-SEA
SFO-SEA-YVR
SFO-LAX
SFO-SAC-ABQ-LAX
SFO-SAC-SLC-DEN-CHI-NYC-WAS
SFO-LAX-ABQ-DFW-ATL-WAS
SFO-SEA-YVR-YTO-YMQ-BOS
SFO-SAC-SLC-DEN-CHI-BOS

N.B.
Paths with the same source and destination are assumed to be equal-cost multiple paths, where the load is split. Even splits between ECMP is default, but the ABM supports operator policy to allow uneven splits between ECMP.

Information in Table-I is learned from the L3 routing topology monitor based on information provided by the listener coordinator, and possibly modified by the LSP management function.

TABLE II

Example Partial Reservation Table in
ABM for traffic originating at PEP at SFO

| Source | Destination | Reservation |
|--------|-------------|-------------|
| SFO | SEA | 10 bwu |
| SFO | YVR | 15 bwu |
| SFO | LAX | 110 bwu |
| SFO | WAS | 50 bwu |
| SFO | BOS | 90 bwu |

Information in Table-II is initially learned from the operator provisioning the information into they system based, most likely, on historical peak demands information or gravity-model provisioning. Over time the reservation table can be updated by PEP's admission requests reflecting the traffic growth.

The information from the path table (Table-I) and the reservation table (Table-II) are joined together to produce a table of information that contains the amount of reserved bandwidth per-link in the network. By comparing the amount of reserved bandwidth to the amount of available bandwidth on a per-link basis, the ABM can determine if there is a congested reservation on any given link. These tables can also be used to track back which demands are congesting any given link.

The example tables given here represent only one data structure that could be used to implement the ABM. Other methods and data structures may also be used.

Referring again to FIG. 1, the S/CAC 104 makes long-term decisions on how to best manage network ingress traffic at PEP's 102 on the edges of a packet-switched network, e.g., for the good of the majority of the users and their connections. Or, to maximize revenues when all users and their connections cannot be accommodated. Traffic management becomes necessary when the packet-switched network nears or exceeds its capacity due to failures or traffic growth.

The remote listeners 120-122 are used to learn and monitor the network topology. Each new report corresponds to how traffic is actually being routed through various ever-changing parts of the packet-switched network.

The listener coordinator 118 continually harmonizes incoming routing topology reports in order to build a topology map from comprehensive point-to-point link information for an update-to-date single view of the network topology.

The L3 routing topology monitor 112 builds such single view of the network topology and converts it into abstracted point-to-point connections for a path table 124. The S/CAC uses said path table to calculate whether particular PEP's can admit more traffic, or should shed sessions/calls, and still keep service up for most pre-existing traffic, and wherein long-term controls are periodically downloaded as admission tables from the S/CAC to the PEP's.

PEP's 102 provide short-term, application-aware admission controls on their own that are applied to corresponding network ingress traffic. An internal admission control table is used as a basic management device to determine how much application traffic in each traffic class can be admitted. For example, voice, video, and data application traffic streams can be treated differently and prioritized. If a new call or session is presented to PEP 102, its admission table is consulted to see if enough bandwidth in that class is reserved for it. If so, the PEP 102 itself can admit the call. Otherwise, the S/CAC 104 must be consulted for increased bandwidth reservations.

The listeners 120-122 are placed at various nodes throughout a managed packet-switched network, and will generate interior gateway protocol (IGP) reports to be received by the listener coordinator 118. Typical IGPs used in carrier networks include OSPF and ISIS.

Each host with a router in the network can use the routing table information to determine the next host to route a packet to for a specified destination. With OSPF, a host that obtains a change to a routing table or detects a change in the network can multicast the information to all other hosts in the network so that they all will have the same routing table information.

In operation, during a network failure, an IGP report will come into one or more of the listeners 120-122 that will inform the ABM 100 of the details of the failure. The results are coordinated by listener coordinator 118 to present a single view of the network to L3 topology routing function 112 for calculation. If present, RSVP-TE LSP information is added to the calculation by LSP manager 116. RSVP-TE is a protocol that can be used by a network operator to create fully or partially explicit paths in the network. MPLS labels are signaled with RSVP-TE, and the resulting LSP's are used to create these paths. The primary purpose of these paths is to offer more optimal paths than could be provided by only using the IGP-calculated shortest paths between each source and destination. The secondary purpose of RSVP-TE is to create a "bandwidth reserved" path between two endpoints. This is an attempt to emulate the circuit-switched model present in the old TDM voice networks. Creating bandwidth reservations using RSVP-TE has significant shortcomings. Among them are 1) inefficient use of network resources, 2) non-deterministic failure scenarios, 3) significant scaling problems due to required per-LSP state and the large number of LSP's required. RSVP-TE makes use of PATH and RESV messages, and other defined objects to signal, establish, and maintain label switched paths.

The PATH message is used to signal and request information required to establish the LSP from end-to-end, from ingress to egress. Each RSVP PATH message includes session attributes and the label request object. RSVP-TE provides ordered downstream-on-demand label manageability, so if a downstream router does not have a label binding to FEC to satisfy a request, it propagates the request downstream until an egress router receives the request. Each router that receives a PATH message stores the information in the path state block (psb). The LSP-ID is used as a unique identifier for each LSP. Egress routers will respond to PATH messages with a reservation (RESV) message.

All routers along the path use Call Admission Control (CAC) to make the necessary bandwidth reservations and distribute the label binding to FEC to the upstream router. The label is distributed using the Label Object. Labels sent up stream become the output labels for the routers receiving the label object. The labels that a router issues to an upstream become the inbound label used as the lookup into the hardware output tag table. The reservation specific information is stored in a reservation state block (rsb). Periodically the state of the LSP is refreshed. There is also a hello timer running to ensure that there is connectivity along each LSP. A full-mesh of LSP's, as a minimum, is typically required.

A path table 124 is calculated and represents a full matrix of all the paths in the routed network, and is passed to the session/call admission controller 104. Path table information is stored in the database 114 for analysis of the historical changes in network paths and path loadings. The analysis can be useful in planning and provisioning future updates and modifications to the network.

Each path defines and reserves all the links in a particular routing through the constituent edge and core routers. But straight reservations can congest link capacity, so session/call admission controller 104 invokes a fairness/cleverness algorithm. For example, see Table-I.

TABLE III fairness/cleverness algorithm example

A reservation A to B takes a link path, A-R-L-D-B.
A change in the network causes link A-R to have 100 fewer units of bandwidth available to it. Formerly it supported 250 units, now it support 150 units.
PATH table reveals link A-R is also used by demands AB and AC.
Query PEP A for the actual utilization of AB and AC.
Example responses, AB 90/100, AC 70/150.
Compute needed bandwidth (RESV-CAP = 100).
Compute free bandwidth (AB = 10, AC = 80).
Divide reservation reduction between paths in minimally intrusive way, e.g., needed bw (100) – free bw = total reduction (TRR) (10). TRR (10) / number of demand pairs (2) = TRR per demand (5). BW adjustment = free bandwidth + TRR per demand.
Adjust reservations for AB and AC demands (AB 100 -> 85, AC 150 -> 65). This causes only 5 units worth of dropped calls per demand.
Push reservations to PEP's 402.

Short-term network demand growth can often be immediately accommodated because new bandwidth increases are implemented in coarse steps up during each capital expenditure. Such overcapacity helps meet current peak demands. For example, adding a same capacity link yields a two fold increase in bandwidth. Moving the equipment up the SONET/SDH hierarchy provides a four fold step up. Moving up the Ethernet hierarchy provides a ten fold increase. The extra capacity is held by ABM 100 in a pool that can be allocated to PEP's as needed to accommodate their respective growing needs.

The admission control audit function 108 catches traffic class misconfigurations. All traffic in certain classes must be under appropriate admission control, otherwise congestion and degradation of service would occur. The admission control audit function 108 uses link RESV and path tables 124 to do its audits.

The network statistic function 110 periodically collects statistics from the network. Per-class traffic statistics are collected from all intermediate links. Per-class traffic statistics are gathered from all access links. A link reservation matrix from the S/CAC module 104 is used to identify these links. If the utilization exceeds the reservations (UTIL>RESV), then an alarm is sent to get such traffic under admission control. Only links listed in the path table 124 should be passing particular traffic classes into the network. If traffic in a particular traffic class is being injected into the network that should not be, or a node that should be under admission control is not, then an alarm is sent to correct the situation. The links listed in the path table 124 should include all relevant nodes in the network.

The network and bandwidth manager 100 implement a complete end-to-end QoS solution. Network signaling is not affected, and component failure in bandwidth manager 100 does not result in a loss of service. So the implementations are stable. Easy scaling is provided by distributed admission controls. The bandwidth manager 100 is application aware, e.g., voice and VoD can take appropriate action to ensure end-user quality of experience. Virtual topologies and policy control account for operators' business needs and therefore provide flexibility. Changes in the network are accommodated automatically by the architecture.

The S/CAC 104 analyzes all the reservation demands and admits reservations based on the available bandwidth in the core network, e.g., 102 in FIG. 1. It distributes an allocation matrix to all the involved media gateways (MGWs). The information describes how much bandwidth is reserved for a particular media gateway to communicate with other media gateway's. Each media gateway manages its allocated bandwidth internally, and will not allow sessions beyond the reservation. An example call connection is described in Table-II. For every active bandwidth reservation, the S/CAC 104 maintains information for a Unique Identifier provided by the media gateway at the time of setup, a Source media gateway (MG), a Source provider edge (PE), a Destination media gateway, a Destination PE, an Owner media gateway, a Bandwidth requirement, a Session Type: Application type, and an Expiry Time: Time/Date at which a session will be deallocated.

TABLE IV example
When subscriber "A" tries to communicate with subscriber "B":

1. A will communicate with media gateway [A];
2. media gateway [A] will resolve the location of "B" and will validate the bandwidth availability between media gateway[A] and media gateway[B] based on local data;
3. media gateway[A] will signal media gateway[B] to initiate communication with "B";
4. media gateway[B] will validate the bandwidth availability between media gateway[B] and media gateway[A] based on local data;
5. Subscriber "B" is alerted to the incoming communication;
6. Communication is up between "A" and "B".

Bandwidth reservation admission comprises a data path search, and a bandwidth availability check. This differs from ATM/TDM admission control systems where the end-to-end connection also needs to be set up. In a network, the data path has already been determined based on the routing protocol, regardless of the utilization of the network. S/CAC 104 relies on the L3 topology and routing function 112 to search for and calculate the shortest path between two PEP's within the managed network. The data path search result is returned in the form of ordered list (in Path Table 124) of all the involved network segments, e.g., as identified by links/nodes.

For data path management, the core network routers can be divided into provider edge (PE) and provider (P) based on the functionality. Media gateways are connected on the edge of the network to the PE. If all media gateway's had to be connected to all other media gateway's, then a large number, n(n−1), of reservations would be generated (where, "n" is the number of provider edge routers).

But all the possible paths in the network do not need to be monitored, so the S/CAC 104 registers for notifications on specific network paths, as identified by source and destination PE's. As a result, any changes or reroutes are included in the notifications that will be issued. In the case of a network event that triggers change to a registered path, update path or "path unavailable" indicators are communicated if the network event resulted in a disconnection in the route.

Bandwidth reservation requests can be submitted as individual requests or as a bulk request (Demand Matrix). A reservation request includes all the information needed to setup a session between two different media gateway's. The request initiator can be a higher system (OSSI API), System administrator (GUI, scripts), or the media gateway itself. Individual bandwidth reservation requests include a Unique Identifier provided by the media gateway at the time of setup, a Source media gateway, a Source PE, a Destination media gateway, a Destination PE, an Owner media gateway, a Bandwidth requirement, a Reservation Length, and an Application Type. Each reservation request return includes a Return code to indicate success or failure, a Reason code to further identify the reason of failure, an Offered bandwidth in case of not being able to satisfy the original request, and a Session description: Reservation Descriptor.

Initially in the network, an adaptive reservation admission algorithm would allow the engineered reservation numbers to converge to real numbers, and after a while an operator could switch a strict reservation admission. Media gateways would not be involved with strict reservation admission, as the admission decision will be based on the S/CAC 104 view of the utilization which is identical to the reservation view. Each media gateway should be able to be interrogated for actual utilization numbers to adjust the reservation numbers when using adaptive reservation admission. The S/CAC 104 can offer a combination of the two algorithms by adding strict flag to the reservation descriptor, and apply adaptive reservation admission. When the strict flag is enabled, the actual utilization can be assumed to be equal the reservation.

A network's core and edges typically comprise preexisting installations and interconnections, and to this are added various control mechanism embodiments of the present invention. The mechanisms added to manage the network must not affect the inherent stability of the network. The mechanisms must be able to scale up in size with the applications and the network, and not be cost-prohibitive to do so. Each application whose resources are being denied or throttled must be made aware that its needs are being affected so it can choose some alternative, e.g., standard video in lieu of high definition. Service operators' business needs and policies must be strictly accommodated. Such mechanisms must be able to bridge the entire network life cycle so QoS can be ensured across the whole operational life-time.

Figure 2B:
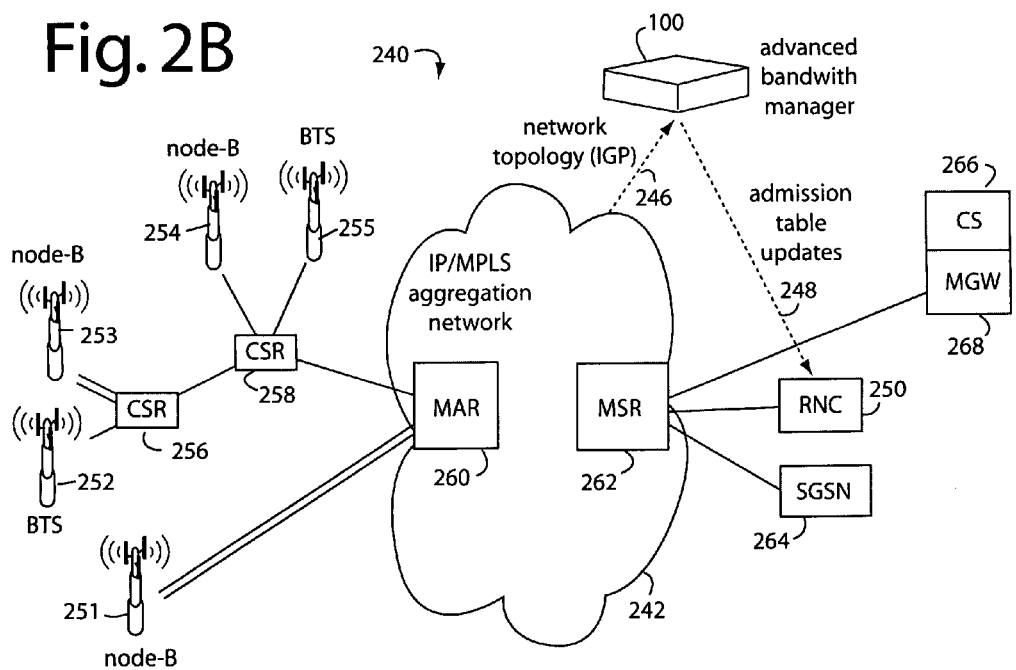
FIG. 2B is a functional block diagram of an packet-switched network embodiment of the present invention for voice in the mobile radio access network.
Figure 2C:
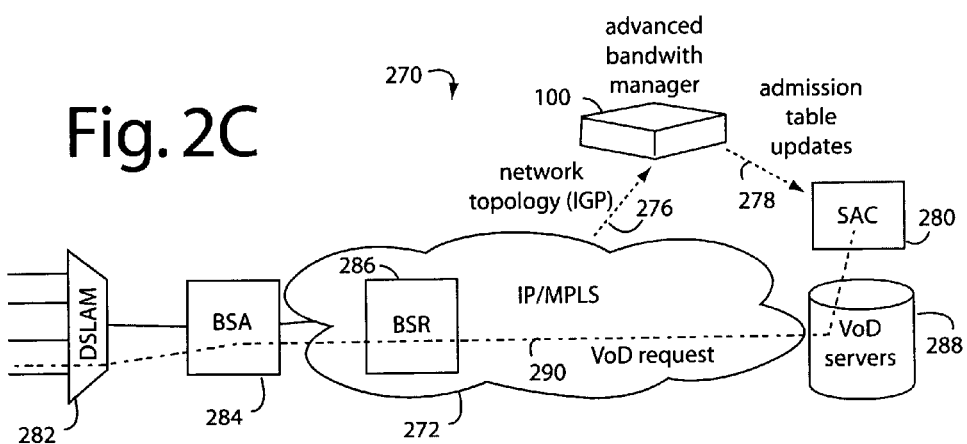
FIG. 2C is a functional block diagram of an packet-switched network embodiment of the present invention for video on demand in triple play networks.

FIGS. 2A-2C represent the three kinds of networks and traffic that require admission controls to guarantee QoS when network capacity is being reached or exceeded. Not all three classes of traffic would be present at a single PEP 102 (FIG. 1), for example. But, a single ABM 100 could be employed to control all types of traffic classes as they traverse a common core network. Specialized PEP's 102 on the edges of their corresponding networks are illustrated in each of FIGS. 2A-2C, e.g., for voice in FIGS. 2A-2B, and for video in FIG. 2C.

FIG. 2A represents a network embodiment of the present invention for voice traffic classes in the Mobile Core, and is referred to herein by the general reference numeral 200. In this application, voice traffic is packetized or simply passed through packet-aware proxies from the edge of a core network 202.

Previously, in TDM networks with session/call admission control (S/CAC), admission controls could be computed in each media gateway from the size of the egress paths to corresponding particular destinations because the circuits were dedicated. The admission control could then be implemented with admission table entries that dictated the bandwidth that could be used for each network destination. In core network 202, the routing topology and supportable bandwidths on the available paths are constantly changing. Individual media gateways do not have the necessary visibility into the network to monitor the routing topology changes, nor can they coordinate the bandwidth loads that other media gateways would place on shared resources.

In some embodiments of the present invention, the network is IP or IP/MPLS, and the bandwidth reservations to be used for admission control is provided to the media gateways from a central point.

Network 200 supports end-to-end quality-of-service (QoS) for voice traffic in mobile core applications. Core network 202 comprises many interconnected core routers, as are represented here by mobile core routers (MCR's) 204-210.

An advanced bandwidth manager (ABM) 100 is attached to the core network 202 such that it can receive network topology reports 214 from listeners, e.g., using an interior gateway protocol (IGP). Point-to-point abstractions from the IGP reports 214 are built and organized into path tables. Admission controls for the network as a whole can then be based on these abstractions. Call destinations are abstracted into point-to-point availability lists.

Admission table updates 216 and 218 are pushed to the network edges to inform the local policy enforcement points (MSR's 204, 210) how they should manage their respective bandwidth loads according to application types. If an edge point needs more bandwidth, e.g., to initiate a new call or connection, resource requests 220 and 222 can be forwarded to the ABM 100. Additional resources can be drawn from a resource pool, or borrowed from other provider edges. Such can make more bandwidth available, and updated admission table updates 216 and 218 are pushed to the affected provider edges.

In FIG. 2A, mobile telephone switching offices (MTSO's) 224 and 226 represent two edge points in one kind of application service, e.g., mobile core networks. In this application, policy enforcement points (PEP's) are embodied in mobile switching centers (MSC's) 230 and 232, and these include a call server (CS) and a media gateway (MGW). MTSO's 224 and 226 include server general packet radio service (GPRS) support nodes (SGSN's) 234 and 236, and a typical gateway GPRS support node (GGSN) 238.

In operation, when a call or connection request comes into MSC 230, the admission control table in MSC 230 is consulted with regard to the call destination point availability, e.g., MSC 232 on the other side of core network 202. Call bandwidth is accommodated and added to the total of the already existing connection loads. The call request is then admitted and routed through the network.

During periods of high user demand, the same call request is received by MSC 230, but the already existing connection loads will be consuming all the reserved bandwidth. So, a more-resources-needed request 220 is sent through MCR 204 to ABM 100 that specifics the point-to-point connection needed, e.g., SFO-NYC (San Francisco to New York City). The ABM 100 searches through its information and routing abstractions to see if the request can be granted. If so, it updates its own view of the network bandwidth loading, and pushes down new admission tables to the affected policy enforcement points, e.g., MSC 230 and 232. The call request can then be routed through to the destination, e.g., MSC 232.

If a network failure were to occur, e.g., between MCR 204 and MCR 207, an IGP network topology report 214 would document such failure to the ABM 100 in real-time. Such would cause a recalculation of all the point-to-point abstractions that depended on the link between MCR 204 and MCR 207. In the meantime, the core network 202 would converge as all MCR's 204-210 become aware of the failure and make their own adjustments.

The PEP's 102 provide for all of the network admission needs based on the numbers that they receive from the S/CAC 104. These numbers are updated only when there is a need to change them. Changes become necessary when a network event results in a loss of resilient bandwidth that effects the traffic class under admission control. Or, when an unexpected surge in traffic exceeds the PEP's reserved resources to a particular destination.

In the first case, the S/CAC 104 recalculates the resources available across the network, and, with an eye to minimizing impact on existing sessions or calls, informs the PEP's of the new resources available. If the new maximum exceeds the current utilization to that destination, the PEP invokes a local priority drop mechanism to back off the traffic until it is under the new limit. For example, a media gateway handling voice calls can keep all emergency calls up, and then invoke a local algorithm, such as random drop, for the remaining calls until calls to the constrained destination are under the new limit. In the second case, where there is an unexpected surge in demand, the PEP can request from the bandwidth manager additional resources to a particular destination.

With its global view of the network, the S/CAC 104 can then either grant or deny this request. The transport network is not affected by session or call admission. Any sort of traffic engineering may be used, and changes to either admission policy or traffic engineering do not effect the other.

By changing the link capacity values in the S/CAC 104, an operator can create and modify virtual topologies. This provides excellent policy control over the networks' admission control. With this capability an operator can, for example, allocate a portion of the physical topology to the application under admission control leaving the rest of the bandwidth for other applications. The same monitoring capabilities that the S/CAC 104 uses to extract topology information from the network can have their results fed into an operator's traffic engineering and operational support tools. This enhances planning to more accurately address future needs and increases network reliability by providing accurate historic information to identify and solve long term problems.

If calculated as being necessary, appropriate admission control table updates 216 and 218 are independently issued by ABM 100 to all affected policy enforcement points. In FIG. 2A that would be MSC 230 and 232.

So, the ABM 100 uses the new topology that exists after the failure to determine if the network can sustain existing reservations. If yes, then no action is needed. If no, then the new reservations calculated are pushed to the relevant policy enforcement points. If availability exceeds demand, then calls stay up. Otherwise, the MGW's, as PEPs, shed whole calls to get back down inline with their local priority algorithm limits. The nature of the application does not permit all calls to be degraded, because no call quality would then be adequate for the service being purchased.

FIG. 2B represents a network embodiment of the present invention for voice in the Mobile Radio Access Network (RAN), and is referred to herein by the general reference numeral 240. An aggregation network 242 has an ABM 100 to monitor network routing topology IGP reports 246 and to compute from them various bandwidth reservations that are pushed down in admission table updates 248. In this application, packetized voice traffic is admitted to the RAN by a Radio Network Controller (RNC) 250. S/CAC is needed in RAN applications because large numbers of low-bandwidth "last-mile" circuits are employed.

In the TDM networks that were previously used in the Industry, the RNC's S/CAC function could be based on the number of TDM circuits existing between a particular cell site, e.g., 251-255, and RNC 250. But, aggregation network 242 does not reasonably allow the destination bandwidth to be obtained from the size or number of circuits, because using point-to-point dedicated circuits between the RNC and BTS limits the efficiency increase provided by an access network. The ABM 100 must provide admission table updates 248 computed from the routing topology information it splices together by monitoring IGP reports 246.

In operation, the voice traffic from cellular telephone node-B and base transceiver stations (BTS's) 251-255 are switched by cell site routers (CSR's) 256 and 258. A mobile aggregation router (MAR) 260 and mobile service router (MSR) 262 transport calls across network 242 first to an RNC 250 which separates the voice and data traffic, and then to an SGSN 264, CS 266, and media gateway (MGW) 268.

The ABM 100 informs the RNC 250 of the resources the RNC can use to each destination. The RNC 250 computes its current utilizations against the capacities it has available. A multi-stage approach can be employed to make more efficient use of the network 242 resources between a hub aggregation site and the RNC. In a single-stage example, an admission table on an RNC 250 located in San Francisco might look like,

| DESTINATION | CURRENT UTILIZATION | CAPACITY AVAILABLE |
|---|---|---|
| SFO.1002 | 1,200 Kbps | 3,000 Kbps |
| SFO.1003 | 1,856 Kbps | 4,500 Kbps |
| SFO.1004 | 222 Kbps | 1,000 Kbps |

The resources between hub sites and the switching office can be shared by many base stations, so admitting traffic against the shared resources in a second stage can result in a more efficient use of the available bandwidth.

A multi-stage admission table in this same example would be like,

| | | STAGE 1 (TO HUB) | | STAGE 2B (TO SITE) | |
|---|---|---|---|---|---|
| DESTINATION | HUB SITE | CURRENT UTILIZATION | CAPACITY AVAILABLE | CURRENT UTILIZATION | CAPACITY AVAILABLE |
| SFO.1002 | SFO.HUB.001 | 3,056 Kbps | 10,000 Kbps | 1,200 Kbps | 3,072 Kbps |
| SFO.1003 | | | | 1,856 Kbps | 4,608 Kbps |
| SFO.1004 | SFO.HUB.004 | 222 Kbps | 1,000 Kbps | 222 Kbps | 1,536 Kbps |

A capacity available limit is provided by the ABM 100, based on its global view of all the network demands. In this example, checks in two stages would be made for each call by the RNC 250 during call set up. In the first check, the call would be checked against the available bandwidth to the hub site. Such hub site may be connected over an Ethernet circuit running IP. In the second check, the system checks the capacity available in the last mile from the hub to the cell site.

FIG. 2C represents a network embodiment of the present invention for video on demand (VoD) in triple play networks, and is referred to herein by the general reference numeral 270. A triple play network 272 is controlled by an ABM 100 that receives network routing topology IGP reports 276. These are coordinated and bandwidth reservations are computed and pushed down in admission table updates 278, e.g., to a session admission control (SAC) 280 of a subscriber services controller (SSC). VoD requests come in from a digital subscriber line access multiplexer (DSLAM) 282 through a broadband service aggregator (BSA) 284 and to a broadband service router (BSR) 286 in the network 272. The requests make it through to VoD servers 288 and to the SAC 280.

An aggregation infrastructure for a service delivery architecture can be based, e.g., on Alcatel-Lucent 7450 ESS type BSA's, and Alcatel-Lucent 7750 SR type BSR's to form a distributed "virtual node". The BSA's do the subscriber-specific functions where the various functions scale, and the BSR's provide the routing intelligence where it is most cost-effective. Network and service scaling are achieved by dividing the Layer-2 and Layer-3 functions between the BSA and BSR and by distributing key service delivery functions. BSA's are more distributed than BSR's, cost-effectively scaling per-subscriber policy enforcement since the required functionality is distributed to lower-cost Layer-2 aggregation interfaces instead of costly router or BRAS interfaces. The BSA incorporates Internet group management protocol (IGMP) proxy multicasting and wire speed security, per-subscriber service queuing, scheduling, accounting, and filtering. The BSA is a high capacity Ethernet-centric aggregation device that supports hundreds of Gigabit Ethernet (GE) ports, tens of thousands of filter policies, and tens of thousands of queues.

BSA's forward traffic using Layer-2 mechanisms, and have the quality of service (QoS) and filtering intelligence to enforce higher-layer policies. Distribution of the QoS functionality on the BSA means that per-subscriber QoS is enforced accurately since it occurs after the last major downstream congestion point, the aggregation network. BSA's aggregate traffic for all services towards the BSR, which is an edge device optimized for DHCP-based video service delivery. It terminates the Layer-2 access and routes using IP over multiprotocol label switching (MPLS), with support for a full set of MPLS and IP routing protocols, including multicast routing (protocol independent multicast, sparse mode (PIM-SM/IGMP). A BSR can support hundreds of GE and synchronous optical network (SONET) uplink ports (for large-scale deployments) and sophisticated QoS for per service and per-content/source differentiation.

BSR 286 provides service distribution routing based on guarantees required to deliver the service and associated content, rather than on individual subscribers. The BSR classifies content based on the required forwarding class for a given BSA 284, to ensure that each service's traffic receives the appropriate treatment towards the BSA.

In the BSR-to-BSA direction in which the video is flowing, IP services rely on IP layer classification of traffic from the network to queue traffic appropriately towards the BSA. Under extreme loading, which would be expected to occur during network fault conditions, lower priority data services or HSI traffic can be rolled back to protect video and voice traffic. Classification of HSI traffic based on source network address or IEEE 802.1p marking allows the QoS information to be propagated to upstream or downstream nodes by network elements.

In the BSA-to-BSR upstream direction, traffic levels are substantially lower. Class-based queuing is used on the BSA network interface to ensure that video control traffic is propagated with a minimal and consistent delay, and that preferred data and HSI services receive better treatment for upstream/peering service traffic than the best effort Internet class of service Networks, such as network 272, that are built to support triple play tend to be very high capacity, and such high capacity will usually minimize the need for S/CAC on the voice application traffic. Voice is low bandwidth but high priority.

VoD, and especially high-definition VoD, consume very large amounts of bandwidth. The VoD traffic class can therefore congest and is a prime application for S/CAC. S/CAC for VoD is most efficient when using multi-stage admission techniques. The natural policy enforcement points for triple play networks are the same points used for subscriber policy control.

In FIG. 2C, admission is performed by the session admission control (SAC) 280 of the subscriber services controller (SSC). The SSC verifies for the VoD system that the subscriber is allowed to request the session. The SAC 280 checks the available network reservations to see that there is enough bandwidth available for the session. The SAC 280 gets its information on what the edge links look like from its understanding of the network topology.

The ABM 100 provides the SAC 280 with any missing links to cover the resources in the routed portion of the network. The routed portion of the network can begin at either the BSA 284 or the BSR 286, depending on the network. A sample admission table might look like, example, a web services protocol, the IETF Industry specified DIAMETER protocol, or other system could be used. Embodiments of the present invention are protocol-mechanism independent, but will most likely use DIAMETER. It is important that the messages be authenticated to ensure that legitimates PEP's 102 are talking to legitimate S/CAC's 104, and vice versa. Such can be done with conventional authentication mechanisms, e.g., hashed message authentication codes (HMACs). The data may be encrypted between the PEP 102 and S/CAC 104 if there is a concern about information intercept.

The messages from S/CAC 104 to PEP 102 may include full or partial admission tables. Each table includes encoded rows for the source, destination, available bandwidth, class-of-service, etc. Such information can be unidirectional or bidirectional, depending on the application.

Table information is used by PEP 102 as the basis for its admission table. PEP 102 adds the current utilization to that destination to the table to form the local admission table. Messages from PEP 102 to S/CAC 104 include requests for information. On boot up, PEP 102 sends a request for the entire table to S/CAC 104. It may also send such request at a later point as well. When the actual or expected utilization to a particular destination will be higher than the reserved bandwidth, PEP 102 sends a request for the desired additional bandwidth.

The S/CAC 104 analyzes the requests, and returns messages increasing the bandwidth to that destination, or it would return a message denying the request and indicating the amount of bandwidth that is available. If the PEP 102 accepts

|  |  | STAGE 1 (TO BSA) | | STAGE 2 (TO DSLAM) | |
| --- | --- | --- | --- | --- | --- |
| DESTINATION | BSR SITE | CURRENT UTILIZATION | CAPACITY AVAILABLE | CURRENT UTILIZATION | CAPACITY AVAILABLE |
| DSLAM.SFO.1002 | SFO.BSR.001 | 2,233,110 Kbps | 8,500,000 Kbps | 1,300,500 Kbps | 2,000,000 Kbps |
| DSLAM.SFO.1003 |  |  |  | 932,610 Kbps | 1,000,000 Kbps |
| PON.SFO.1004 | SFO.BSR.004 | 5,439,000 Kbps | 8,500,000 Kbps | 5,439,000 Kbps | 8,500,000 Kbps |

The capacity available limits are provided by the ABM 100 according to its global view of the network demands. VoD is an ideal application for virtual topologies. In a triple-play network, voice is usually marked above video, and video above data. Such ensures that voice will get through, regardless of the video traffic. However, VoD can consume so many resources it is possible that the VoD could entirely starve the data class. This would result in customers' data connections becoming almost useless.

Such cannot be prevented with network based class-of-service markings. Assigning a virtual topology with resources less than the physical link bandwidth will guarantee that a certain minimum bandwidth will be preserved for data traffic. ABM 100 provides such critical capability in a simple, scalable way.

FIG. 3 represents the call/session signaling hardware included in PEP 102, and is referred to herein by the general reference numeral 300. PEP signaling hardware 300 includes a call/session signaling module 302, a call/session signaling setup queue 304, a memory 306, a call switch (CS) interface 308, and an ABM interface 310.

PEP 102 and S/CAC 104 reservations/negotiation traffic 105 (FIG. 1) through ABM interface 310 can be implemented with a number of well-known and reliable protocols. For the bandwidth the S/CAC 104 indicated is available, it then sends an additional request specifying that amount.

Figure 4:
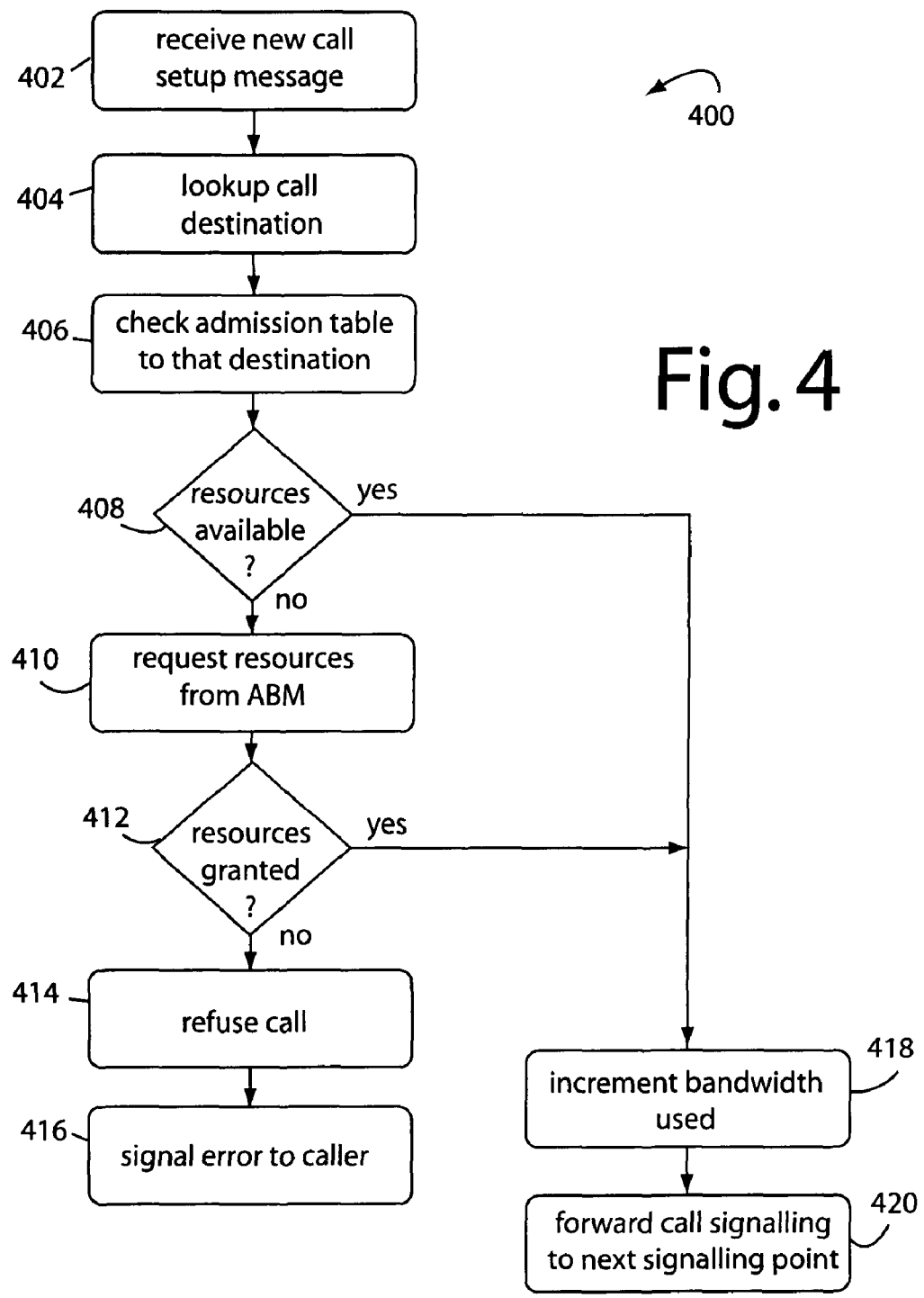
FIG. 4 is a flowchart diagram of PEP call setup embodiment of the present invention that provides bandwidth to new traffic being presented at a policy enforcement point, as in FIG. 1.

FIG. 4 represents a call setup method embodiment of the present invention, and is referred to herein by the general reference numeral 400. A new call setup message is received in a step 402. A step 404 looks up the call destination. The admission table entry for that destination is consulted in a step 406. A step 408 sees if the bandwidth is already reserved and available locally. If not, the ABM (really the S/CAC 104) needs to be consulted in a step 410. A step 412 looks to see if the requested resources were granted. If not, a step 414 has to refuse the call, and a step 416 sends an error signal to the caller. But if resources were locally available at the PEP 102, or they were granted by the ABM, then a step 418 increments the bandwidth being used, and a step 420 forwards call signaling to the next point.

Figure 5:
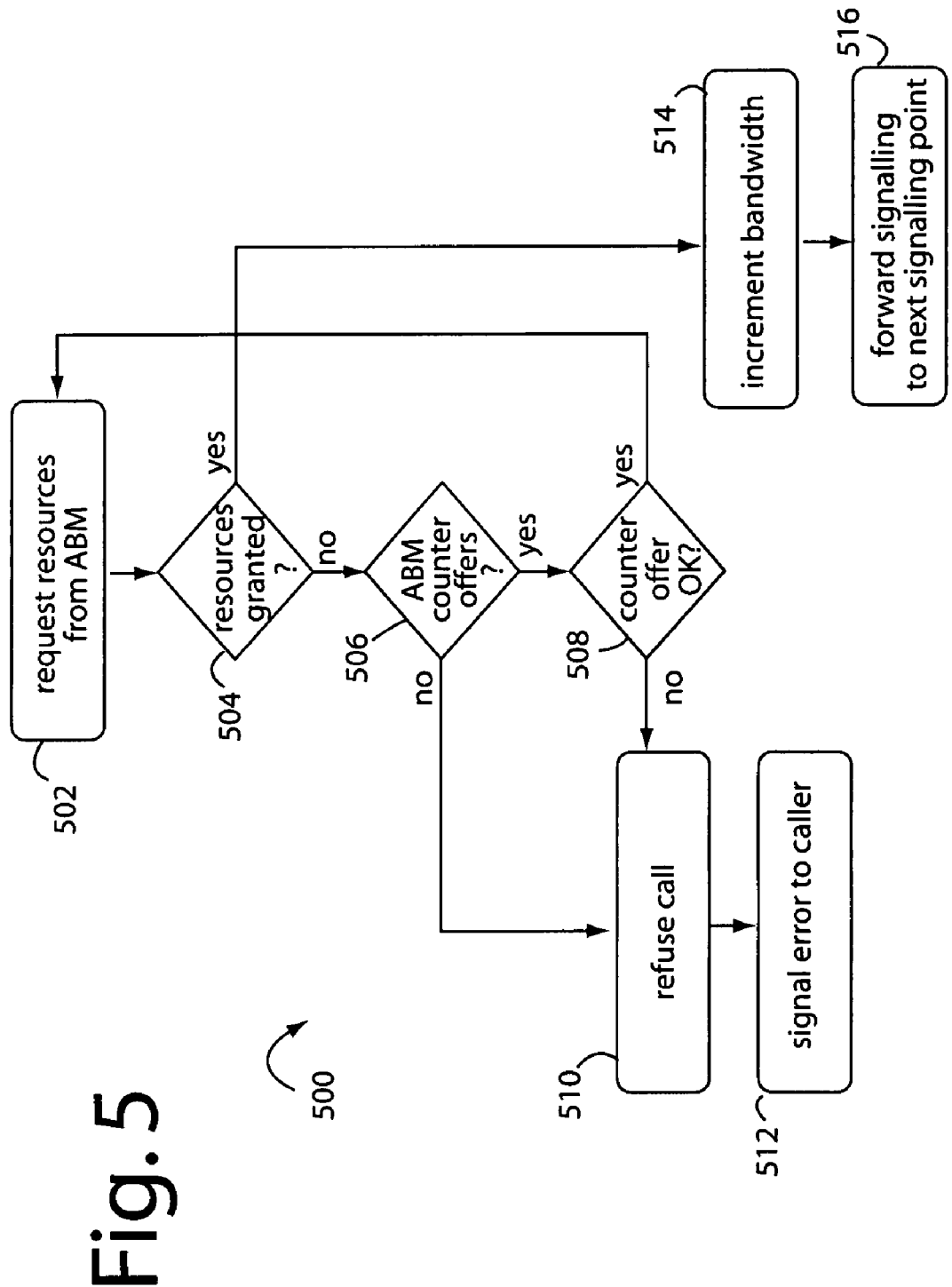
FIG. 5 is a flow chart diagram of policy enforcement point and session/call admission controller negotiation process embodiment of the present invention that bargains for increases in bandwidth reservations as new calls are presented at the PEP that would overstep its existing capacities.

The bandwidth negotiation is diagrammed in FIG. 5 as a negotiation method 500. Requests for ABM resources are issued in a step 502. A step 504 sees if the requests can be granted. If not, a step 506 sees if there is a counter offer from the ABM. If yes, a step checks the acceptability of the counter offer. If not acceptable, then a step 510 refuses the call, and a step 512 signals the error to the caller. Otherwise, if the resources are granted, then a step 514 increments the bandwidth and a step 516 forwards signaling to the next point.

In a traditional TDM system, when a link is torn down along a path from A-B, the system that originates the calls holds onto the calls, and attempts to re-admit them by re-signaling the calls on a hop-by-hop basis through to the other end. Each call is re-signaled. Assuming an alternate path is available, calls are held in a queue. While the calls are in a queue, communication between the endpoints is severed. Users may drop off if the disruption is long enough. Eventually, the re-signaling may fail since insufficient resources may be available along an alternate path.

In S/CAC 104, failures that do not affect the session/call load are not re-signaled at all. If, after recalculating, there is no need to update a given PEP 102 reservation table. All calls stay up, there is no impact, the call/session data is rerouted by the underlying data network, and is largely invisible to the user of the application. If a failure is severe enough that it would impact the session/call load on a PEP 102, then the work around to the failure is communicated to the PEP 102 with a reservation update. The PEP 102 then locally drops calls if necessary to stay within the new reservation limit.

Which local drop algorithm to use is a local decision, but emergency calls should stay up. Other calls can be dropped using whatever priority mechanism is desired by the operator, e.g., longest call, shortest call, random call. There is no need to hold and re-signal calls. Calls that do not get dropped maintain their up status and communication bridges over the failure event. Session/call data is rerouted by the underlying network and is largely invisible to the user of the application.

Because circuits are available in rough sizes and capacity should lead utilization, there is often extra unused marginal bandwidth in a network. Such excess bandwidth can be proportionally over-allocated to each PEP 102 based on estimated demand growth. While simple, an occasional re-allocation is needed since demand estimates are not perfect. Or, the excess can be held in reserve by the S/CAC 104, and allocated to PEP's 102 in future requests. Such is a little more complicated to implement, but the reservations are only allocated when there is a need, and can better keep up with real demand growth.

An ABM method embodiment of the present invention requires the S/CAC 104 to shed particular sessions/calls that are calculated to maintain service for existing application traffic, and that maximizes at least one of total revenues being earned, total number of calls remaining, and customer goodwill.

Figure 6:
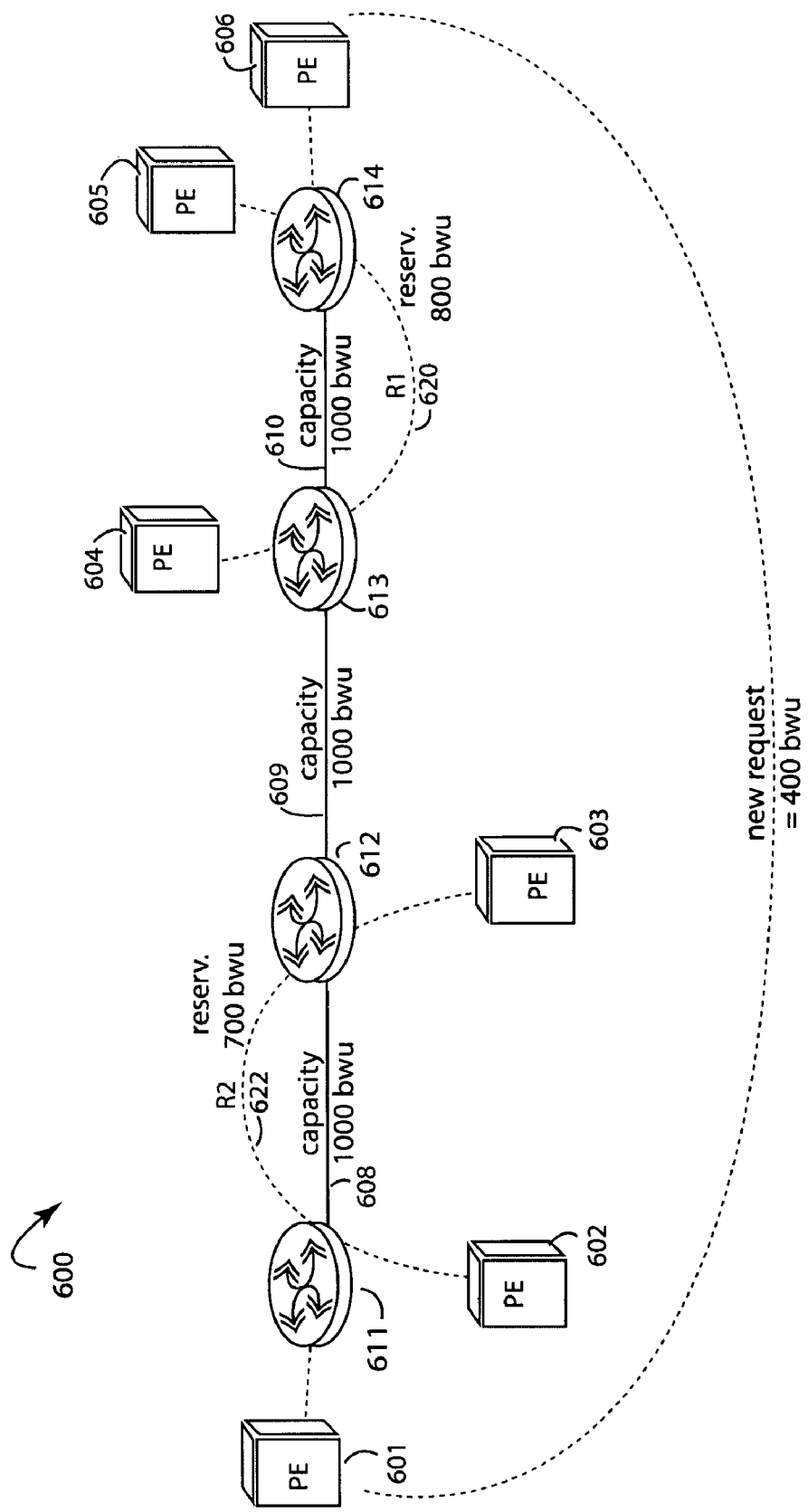
FIG. 6 is a diagram showing how a strict reservation admission algorithm embodiment of the present invention would function in admitting new calls and re-admitting rerouted calls.

FIG. 6 represents how a strict reservation admission algorithm embodiment of the present invention would function in admitting new calls and re-admitting rerouted calls. A four-hop segment 600 of a network supports provider edges (PE's) 601-606. In a first phase, the path search, L3 routing topology mapping function is used to calculate a shortest path between the provider edges involved, and, e.g., a four-hop segment 600 between PE 601 and PE 606 is entered into a path table. In a second phase, all the involved segments 608-610 between routers 611-614 are inspected to determine their respective bandwidth availabilities. Many different kinds of admission algorithms are possible, some will be better than others for particular applications.

In the example of FIG. 6, the capacity set on each of three links 608-610 is 1000 BW-units (bwu). In this example, there are two existing reservations, R1 620 between PE 604 and PE 605 for 800 BW-units, and R2 622 between PE 602 and PE 603 for 700 BW-units. These share parts of the four-hop segment 600.

To further illustrate a typical admission algorithm, assume a new request to be admitted requires 400 BW-units from PE 601 to PE 606. Inspecting links 608-610 reveals that there are 300-1000-200 BW-units available, respectively. The admission will be rejected because the minimum link with 400 available BW-units is less than the 400 BW-units needed.

In a next example for an adaptive reservation admission algorithm, suppose the applications are actually using less than what was originally reserved. If an interrogation of the media gateways revealed R1 620 was actually using 600 BW-units, and R2 622 was consuming 600 BW-units, then a reservation update procedure could be kicked in to adjust R1 620 and R2 622. The new reservations would then allow the accommodation of the previous example's 400 BW-unit request between PE 601 and PE 606. When a media gateway responds to an actual utilization query, it should answer with near future usages factored in to avoid having to immediately initiate another reservation update.

Initially in the network, an adaptive reservation admission algorithm would allow the engineered reservation numbers to converge to real numbers, and after a while an operator could switch a strict reservation admission. Media gateways would not be involved with strict reservation admission, as the admission decision will be based on the S/CAC view of the utilization which is identical to the reservation view. Each media gateway should be able to be interrogated for actual utilization numbers to adjust the reservation numbers when using adaptive reservation admission. The S/CAC can offer a combination of the two algorithms by adding strict flag to the reservation descriptor, and apply adaptive reservation admission. When the strict flag is enabled, the actual utilization can be assumed to be equal to the reservation.

When existing reservations congest link capacity, a fairness/cleverness algorithm can be invoked. Consider the link reservations in the following Table (Table-V).

TABLE V

Link Reservation Table

| link | reservation | capacity |
|------|-------------|----------|
| AR   | 250         | 150      |
| RL   | 100         | 150      |
| LD   | 100         | 150      |
| DB   | 100         | 600      |
| RW   | 150         | 600      |
| WC   | 150         | 150      |

Suppose link-AR is used by demands AB and AC, as logged into a path table. PEP-A can be queried by the S/CAC for its actual utilization between AB and AC. If the response was AB 90/100, and AC 70/150, that means demand AB is using 90-bwu of it's 100-bwu capacity, and demand AC is using only 70-bwu of its 150-bwu capacity. The needed bandwidth is computed as RESV-CAP=100-bwu. The free bandwidth is computed as AB=10, and AC=80.

The reservation reductions proposed between paths are divided in a minimally intrusive way, e.g., needed bw (100)– free bw (90)=total real reduction (TRR) (10). So TRR (10)/ number of demand pairs (2)=TRR per demand (5). BW adjustment=free bandwidth+TRR per demand. The reservations for AB and AC demands, using a fairness/cleverness algorithm, are adjusted (AB 100→85, AC→65), and causes only 5-bwu worth of dropped calls per demand. The new reservations are then pushed to the affected PEP's by downloading appropriate admission tables.

Traffic Engineering (TE) is used to optimize the performance of operational networks, and is implemented by TE tool 126 (FIG. 1). TE measures, models, and characterizes Internet traffic to achieve specific performance objectives.

Internet Traffic Engineering is used to make network operations more efficient and reliable, while also optimizing network resource utilization and traffic performance.

Traffic Engineering has become necessary because of competitive pressures and the high cost of network assets. Traffic Engineering performance objectives can be traffic oriented or resource oriented. The traffic oriented performance objectives include enhancing traffic stream QoS, packet loss minimization, delay minimization, throughput maximization, and service level agreement enforcement. In a single class, best effort Internet service model, the minimization of packet losses can be one of the more important traffic oriented performance objectives.

Resource oriented performance objectives include more efficient management of network resources. It is important that a balance be maintained among all the subsets of network resources. Unbalances can over-utilize and congest some subsets of network resources, while other subsets go under-used or idle. Bandwidth is the crucial resource in networks, so Traffic Engineering is used to efficiently manage the bandwidth resources.

Minimizing congestion is a primary traffic and resource performance objective. Prolonged congestion problems are much more of concern than the transient congestion that occurs during traffic bursts. Congestion generally can occur when the network's resources are insufficient or inadequate to accommodate the load, and congestion can occur when traffic streams are ineffectively mapped onto the topology of available resources, e.g., causing subsets of network resources to become over-utilized while others remain underutilized.

The first type of congestion problem can be addressed by expanding capacity, or by trying to control the demand, or both. Congestion control can include rate limiting, window flow control, router queue management, schedule-based control, etc. Inefficient resource allocations can be addressed by suitable Traffic Engineering.

Congestion resulting from inefficient resource allocation can be reduced by adopting load balancing policies that limit maximum congestion or minimize maximum resource utilization, through efficient resource allocation. Minimizing congestion with efficient resource allocation, packet loss decreases, transit delay decreases, and aggregate throughput increases.

The network service quality experienced by end users is significantly enhanced. Load balancing is an important network performance optimization policy. In a traffic engineering process model, the Traffic Engineer, or a suitable automaton, acts as a controller in an adaptive feedback control system. This system includes a set of interconnected network elements, a network performance monitoring system, and a set of network configuration management tools. The Traffic Engineer formulates a control policy, observes the state of the network through the monitoring system, characterizes the traffic, and applies control actions to drive the network to a desired state, in accordance with the control policy. This can be accomplished by responding to the current state of the network, or by anticipating future trends and applying action to obviate the predicted undesirable future states.

The way interior gateway protocols capabilities have been traditionally used, has resulted in poor Traffic Engineering in many networks. IGP's base their forwarding decisions on the calculation of a shortest path between each source and destination. How "far" a node is away from another node is determined through the value of a metric attribute, which takes the form of a positive integer value. These metrics are added together to determine the total distance between a source and a destination. Traditional wisdom has recommended setting these metrics based on either 1) physical distance between the nodes, or 2) inverse to the size of the link i.e. higher capacity links have lower metrics. This makes them more preferred then their lower capacity cousins. When these traditional methods are followed.

Congestion occurs when the shortest paths of multiple traffic streams converge on specific links or router interfaces, or a given traffic stream is routed through a link or router interface which does not have enough bandwidth to accommodate it. Such congestion can manifest even when feasible alternate paths with excess capacity exist.

An alternate method of setting IGP metrics exists. This method, known as IGP metric traffic engineering, or IGP optimization involves an external traffic engineering system. This external system takes the network topology and demands the network must serve and applies advanced mathematics to determine the best IGP metric for each link. For many topologies and demands IGP optimization results in a highly efficient, simple way to engineering the network. However, IGP metric based Traffic Engineering depends on the demands applied to the network and to the topology of the network. For many networks is offers an efficient, simple way to engineer the network. For other networks, with different topologies or demands, it may not be the best method.

One other approach to overcome the inadequacies of current IGP's is an overlay model, such as IP over ATM, or IP over frame relay. The overlay model extends the design space by enabling arbitrary virtual topologies to be provisioned atop the network's physical topology. The virtual topology is constructed from virtual circuits which appear as physical links to the IGP routing protocols.

The overlay model provides constraint-based routing at the virtual circuit (VC) level, support for administratively configurable explicit VC paths, path compression, call admission control functions, traffic shaping and traffic policing functions, and survivability of VCs. These capabilities enable the actualization of a variety of Traffic Engineering policies. For example, virtual circuits can easily be rerouted to move traffic from over-utilized resources onto relatively under-utilized ones.

A variation on the overlay model is possible through the use of MPLS. There are two versions of the MPLS method. The first is to build the same overlay network that would be built with ATM or FR equipment, except substituting faster, more cost efficient MPLS switches. The second variation allows for cost savings by integrating the overlay path directly into the same routers that are providing the IP forwarding.

The MPLS-based method are more complex than the IGP optimization method, however, for some situations they can offer more efficient traffic engineering.

Because there is no single best way to traffic engineer a network, an admission control method must not be tied to a traffic engineering method. An operator's S/CAC method must be useful regardless of the underlying traffic engineering method. This allows the operator to choose the best TE method for their network and operational model.

Figure 7:
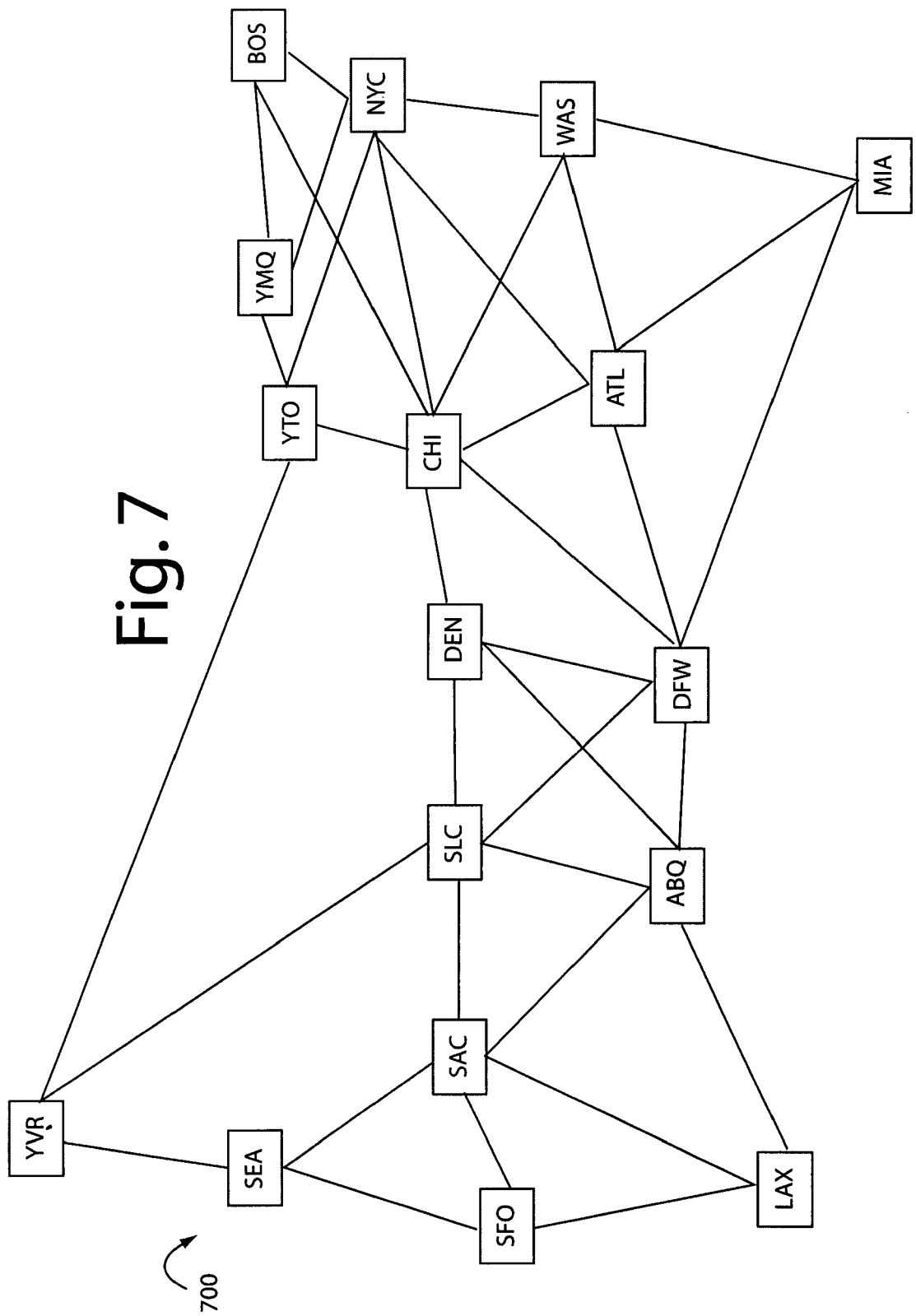
FIG. 7 is a diagram representing a simple exemplary MPLS network routing topology for a network in the United States.

FIG. 7 represents a simple exemplary packet-switched network routing topology for a network in the United States. Each major city represented here has a label switching router that can serve as a source, destination, or transit point label switching router for voice, video, and data application traffic. Table VI is an end-to-end abstraction tabulation of various paths across the network that can begin in San Francisco (SFO). Reservations according to traffic class can further be allocated, apportioned, and prioritized according to service level agreements. Such example corresponds to a small part of path tables 124 in FIG. 1, and would be used with an admission table locally in the (SFO) PEP 102.

TABLE VI

Example Reservations mapped to Paths for PEP at SFO

| Path | RESV |
|---|---|
| SFO-SEA | 10 bwu |
| SFO-SEA-YVR | 15 bwu |
| SFO-LAX | 100 bwu |
| SFO-SAC-ABQ-LAX | 10 bwu |
| SFO-SAC-SLC-DEN-CHI-NYC-WAS | 20 bwu |
| SFO-LAX-ABQ-DFW-ATL-WAS | 30 bwu |
| SFO-SEA-YVR-YTO-YMQ-BOS | 50 bwu |
| SFO-SAC-SLC-DEN-CHI-BOS | 40 bwu |

In general, embodiments of the present invention are used with and benefit IP, MPLS, and IP/MPLS networks.

Although the present invention has been described in terms of the presently preferred embodiments, it is to be understood that the disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the "true" spirit and scope of the invention.

The invention claimed is:

1. A triple-play network, comprising:
a triple-play network virtual topology assigned lesser resources than resources available for traffic on an underlying physical link bandwidth to prevent starvation of data-class traffic by video-on-demand (VOD);
policy enforcement points (PEP's) for applying autonomous short-term, application-aware controls to autonomously control admission of corresponding network ingress traffic at each PEP, and applying long-term traffic controls on said corresponding network ingress traffic;
wherein applying autonomous short-term, application aware controls and applying long-term traffic controls comprises, for each PEP:
receiving a new call or session at the PEP;
the PEP determining if enough resources are available for the new call or session;
admitting the new call or session if the PEP determines that there are enough resources; and
requesting from a session/call admission controller (S/CAC) increased reservation resources if the PEP determines that there are not enough resources;
admission control tables received from the S/CAC for network admission need, wherein said admission control tables are updated when a network event results in a loss of resilient bandwidth that effects a traffic class under admission control, and when a surge in traffic exceeds a reserved resource in a PEP to a particular destination; and
the updated admission control tables for informing the PEP of network resources that are determined to be available to the PEP, wherein the updated admission control tables comprise recalculations of the network resources available across said triple play network that minimize adverse impacts on existing sessions and calls.

2. The network of claim 1, further comprising:
a local priority drop scheme at each PEP to equally back off some traffic until total traffic is under a new limit if a new maximum exceeds a current utilization to a destination.

3. The network of claim 1, further comprising:
a drop process to shed remaining calls until calls to a constrained destination are under a new limit.

4. The network of claim 1, wherein:
if there is an unexpected surge in demand, the PEP's request additional resources to the particular destination;
wherein, said network is not affected by session or call admission, and changes to either admission policy or traffic engineering do not affect each other.

5. The network of claim 1, further comprising:
a device for changing link capacity values to create and modify virtual topologies and afford policy control over the network's admission control.

6. The network of claim 1, further comprising:
a device for allocating a portion of a physical topology to an application under admission control to make remaining bandwidth available for other applications.

7. The network of claim 1, further comprising:
a topology monitor to extract topology information from the network for operator traffic engineering and operational support tools, to accurately address future needs and increase network reliability by providing accurate historic information to identify and solve long term problems.

8. The network of claim 1, further comprising:
a device for calculating if the PEP may admit more, or must shed, session/calls to maintain service for other existing application traffic; and
a device for shedding particular sessions/calls in a way that is calculated to maintain service for existing application traffic and that maximizes at least one of total revenues being generated, total number of calls remaining, and customer goodwill.

9. The network of claim 1, further comprising:
a device for downloading of the updated admission control tables to the PEP when it in particular is affected by a change in packet-switched network topology or bandwidth reservation capacity.

10. The network of claim 1, further comprising:
a device for negotiating between said S/CAC and the PEP to enable the PEP to request additional network resources, and for said S/CAC to communicate to the PEP that the request has been granted, and for the PEP to thereafter make local decisions to admit calls requiring said additional network resources.

11. The network of claim 1, further comprising:
a device for bargaining between the S/CAC and the PEP to enable the PEP to request additional network resources, and for said S/CAC to communicate to the PEP that the request can only partially be granted, and for the PEP to accept a partial grant and thereafter make local decisions to admit calls that require only part of said additional network resources.

12. A method for video-on-demand (VOD) admission control at a triple-play network comprising:
assigning a triple-play network virtual topology lesser resources than resources available for traffic on a corresponding underlying physical link bandwidth to prevent starvation of data-class traffic by video-on-demand (VOD);
attaching at least one policy enforcement point (PEP) to an edge of said network, and providing for autonomous short-term, application-aware controls to autonomously control admission of corresponding network ingress traffic at the at least one PEP, and further providing for long-term traffic controls on said corresponding network ingress traffic;
wherein providing for autonomous short-term, application aware controls at the at least one PEP and providing for long-term traffic controls comprises:
  receiving a new call or session at the at least one PEP;
  the at least one PEP determining if enough resources are available for the new call or session;
  admitting the new call or session if the at least one PEP determines that there are enough resources; and
  requesting from a session/call admission controller (S/CAC) increased reservation resources if the at least one PEP determines that there are not enough resources;
managing said corresponding network ingress traffic to said network when such nears or exceeds a capacity of said network, and that is enabled to do so by computations of current network routing topology and bandwidth reservations; and
using path tables to calculate if the at least one PEP may admit more, or must shed, sessions/calls to maintain service for other existing application traffic;
wherein each of the at least one PEP and the S/CAC are independently located within the topology of the network, and each uses said network to communicate with one another, and together implement admission controls that differentiate between traffic classes.

* * * * *